United States Patent [19]

Brantley et al.

[11] 4,336,582
[45] Jun. 22, 1982

[54] ENERGY SAVING DC-DC CONVERTER CIRCUIT

[75] Inventors: William C. Brantley, Allentown, N.J.; John E. Edington, Indianapolis, Ind.

[73] Assignee: Bell Telephone Laboratories, Incorporated, Murray Hill, N.J.

[21] Appl. No.: 132,166

[22] Filed: Mar. 20, 1980

[51] Int. Cl.³ ............................................. H02M 3/22
[52] U.S. Cl. ...................................... 363/15; 363/59; 315/241 P
[58] Field of Search .............. 315/225, 241 P; 363/19, 363/21, 23, 25, 59, 15

[56] References Cited

U.S. PATENT DOCUMENTS

| | | | |
|---|---|---|---|
| 2,917,696 | 12/1959 | Michaels | 363/15 |
| 3,229,158 | 1/1966 | Jensen | 363/25 X |
| 3,273,040 | 9/1966 | Schuster | 363/23 |
| 3,388,309 | 6/1968 | Banks et al. | 363/23 |
| 3,532,961 | 10/1970 | Bramer | 363/23 |
| 3,644,818 | 2/1972 | Paget | 315/241 P |
| 3,737,756 | 6/1973 | Hasley et al. | 363/21 |
| 3,771,040 | 11/1973 | Fletcher et al. | 363/21 |
| 4,055,790 | 10/1977 | Gerding et al. | 363/25 X |
| 4,080,646 | 3/1978 | Dietrich et al. | 363/22 |
| 4,084,219 | 4/1978 | Furukawa et al. | 363/21 |
| 4,210,947 | 7/1980 | Koizumi | 363/21 X |

OTHER PUBLICATIONS

*Service Instructions for "Meteor SP", Electronic Flash*, VKD-F. 368, Robert Bosch, GmbH.

*Primary Examiner*—William M. Shoop
*Attorney, Agent, or Firm*—H. L. Newman

[57] ABSTRACT

An energy saving DC-DC converter circuit is disclosed having two energy efficient means which operate in tandem, an energy conserving means (30, 8, 1) and a voltage doubling means (26). These energy efficient means are applied in combination with elements commonly found in DC-DC converter circuits, namely an AC voltage generator (2), a transformer (3) for stepping up the generated AC voltage, and means (31) for storing the converted DC voltage. The energy conserving means is connected to the DC voltage storage means (31). It comprises a resettable inhibit circuit (1) which cuts off the provision of DC voltage for conversion for a predetermined interval when the output of the converter exceeds a predetermined level. The voltage doubling means is reponsive to outputs of the inhibit circuit (1) of the energy conserving means and the AC voltage generator (2). It provides a phase inverted waveform of the generated AC voltage on one of two leads to the AC voltage step-up transformer (3).

10 Claims, 2 Drawing Figures

ENERGY SAVING DC-DC CONVERTER CIRCUIT

TECHNICAL FIELD

This invention relates to circuitry for the conversion of one level of direct current voltage to a higher voltage level and, more particularly, to circuitry in combination therewith for conserving energy.

BACKGROUND OF THE INVENTION

Manufacturers of portable electrical testing and measuring apparatus are often faced with the problem of providing in their test apparatus a means for converting low battery voltages to high direct current voltages. The low battery voltages are often insufficient for operating electrical circuitry of the test apparatus or for testing the operation of equipment external to the test apparatus.

Circuitry for performing the conversion function is known. Elements commonly comprising such circuitry are a battery or other direct current voltage source, a direct current operated generator of alternating current voltage, a means for stepping up the generated AC voltages, and a means for rectifying the stepped-up AC voltage, restoring its DC character. Additionally, many such circuits provide a capacitor for filtering and smoothing the rectified voltage and for storing it for subsequent application to a load.

In addition to the DC-DC conversion feature itself, another feature that is clearly desirable is that the DC-DC conversion be performed efficiently. The DC-DC conversion means should require as little energy of the battery or direct current voltage source as possible. Efficiently operating apparatus conserves energy. With respect to battery operated portable apparatus, the inconvenience of having to replace energy storage batteries may be postponed.

Pursuant to solving this problem, previous efforts have been concerned with improving the energy efficiencies of the individual elements commonly found in DC-DC converter circuits. For example, the application of an energy efficient step-up transformer might be suggested.

Other efforts have been concerned with regulating the output of the DC-DC converter circuit relative to the applied input DC voltage. Alternatively, it has been suggested that operating parameters of the elements of the DC-DC converter may be modified based upon the detected magnitude of the converted DC output voltage.

These efforts have provided useful alternative means for conserving energy in DC-DC converter circuits whose outputs are used continuously. However, the subject DC-DC converter circuit was developed for use in portable high voltage relay operation test equipment. In such an application, the converted DC output voltage is only used infrequently and for short durations. This discontinuous use characteristic is also shared with DC-DC converter circuits, employed in portable DC high voltage breakdown test apparatus, electronic photographic flash equipment, and electrical emergency first aid equipment. For these applications, there is believed to be a need for alternative solutions to the energy conservation problem.

SUMMARY OF THE INVENTION

The above-stated problems and related problems are solved with the principles of the disclosed DC-DC converter circuit.

The circuit comprises a voltage doubling means and an energy conserving means which operate in tandem. The voltage doubling means is connected between the AC voltage generating means and the AC voltage step-up means and increases the efficiency of the latter element. The voltage doubling means provides the generated AC voltage waveform on one lead and a phase-inverted waveform on the second of two leads to the voltage step-up means. In this manner, twice the value of AC voltage appears at the input to the voltage step-up means than is provided without such means.

The energy conserving means takes advantage of the discontinuous use characteristic of certain applications of DC-DC converters to save energy. The energy conserving means inhibits the presentation of an input voltage for conversion for a predetermined interval when the output voltage exceeds a predetermined level. The energy conserving means comprises a detection circuit for detecting when the voltage exceeds the predetermined level, an activation means responsive to the detection means, and a means responsive to the activation means for inhibiting the presentation of a DC voltage for conversion for the predetermined interval. Because energy is only applied to the circuit periodically and for short intervals, an 80% energy savings has been achieved.

In the best mode of practicing the subject DC-DC converter circuit, the voltage doubling and energy conserving means operate in tandem as follows. The voltage doubling means is responsive to receiving inputs from both the inhibit circuit of the energy conserving means and the AC voltage generating means. Such operation provides a fail-safe feature insuring the timely provision of DC converted output voltage.

These and other features of the present invention will become apparent from a study of the following description of an embodiment of the invention.

DETAILED DESCRIPTION

Figure 1:
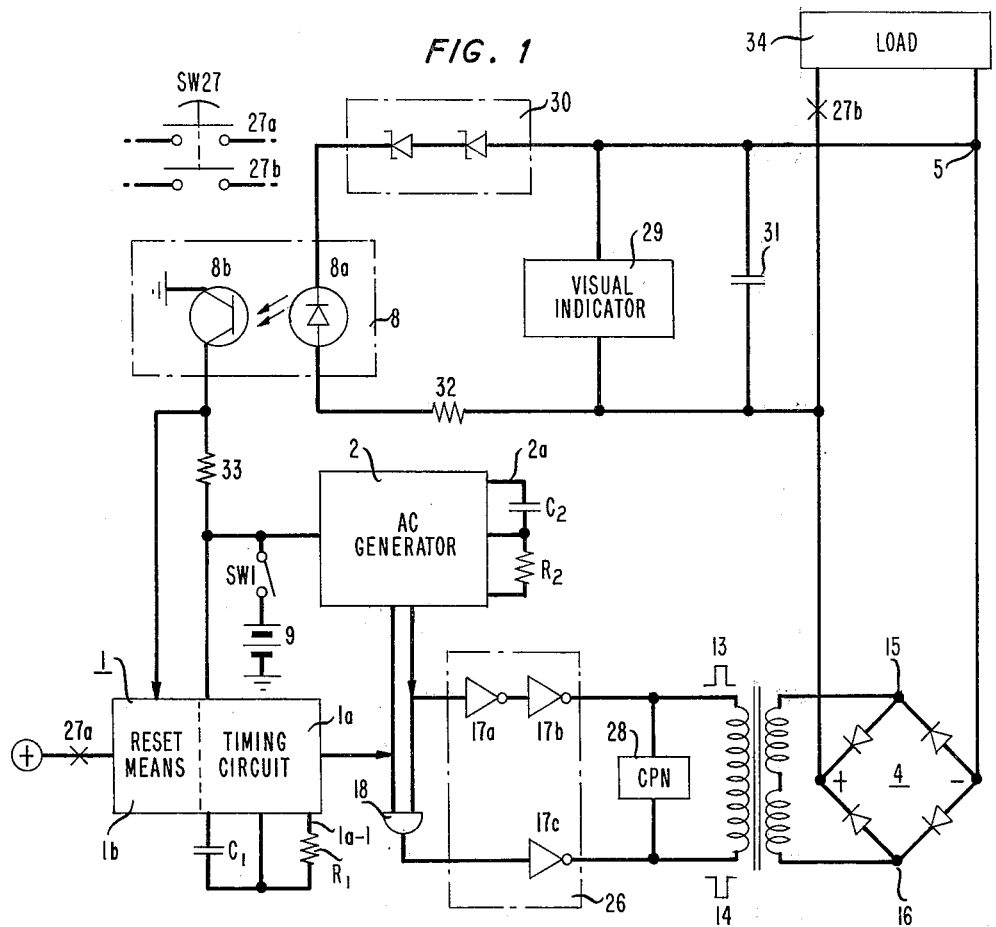
FIG. 1 is a block diagram and schematic drawing of the preferred embodiment of the energy saving DC-DC converter circuit.

Referring to FIG. 1, an energy saving DC-DC converter circuit in accordance with the present invention is shown in block diagram and schematic drawing format. Turning on battery on/off switch SW1 causes a DC battery voltage to be provided by a battery 9 or other direct current voltage source. This battery voltage is converted to a high level direct current voltage for storage upon a direct current voltage storage means comprising capacitor 31. When sufficient voltage has been stored, indicated by visual indicator 29, the user of the circuit pushes test activate switch SW27 to close contacts 27a and 27b. The converted DC voltage is then provided to load 34.

Elements commonly found in DC-DC converter circuits perform the conversion function. Means for generating an AC voltage 2 generates a square wave AC voltage responsive to a signal provided on lead 10. The frequency of the AC voltage generated is selectable by varying the values of resistor $R_2$ and capacitor $C_2$. A Radio Corporation of America CD 4047 monostable/astable multivibrator or equivalent may be used to generate the square wave output. (Refer to Table A for pin strapping information.) In one specific embodiment of the present invention, AC generator 2 provides an eighteen volt alternating current square wave voltage from an eighteen volt DC battery input.

level attainable M is 180 volts DC. The sum of the Zener cut-off voltages L has been chosen to be 90 volts.

Also connected across capacitor 31 is activation means 8. Activation means 8 comprises an opto-isolator comprising two elements, an opto-emitter diode 8a and a photo-responsive transistor 8b. The opto-emitter diode is connected in series with the detection means 30. An opto-emitter diode was chosen over other activation means such as a relay for two reasons: because of its low energy consumption and because of the isolation it provides between the output and the input of the present

TABLE A

| Reference Character | Description | Pins Connected | | | | | | |
|---|---|---|---|---|---|---|---|---|
| | | $+V_{cc}$ | GRD | Reset | Activate | Output | R | C |
| 1 | CD 4047* | 4, 8, 14 | 5, 7, 12 | 9 | 6 | 11 | 3, 2 | 1, 3 |
| 2 | CD 4047* | 4, 6, 14 | 7, 8, 9, 12 | NA | 5 | 13 | 3, 2 | 1, 3 |
| 17a | CD 4049* | | | | 3 | 2 | | |
| 17b | | | | | 5 | 4 | | |
| 17c | | | | | 7 | 6 | | |
| 18 | CD 4011* (2 NAND gates in series) | | | | 8, 9 | 10 | | |
| | | | | | 12, 13 | 11 | | |

*Radio Corporation of America Integrated Circuit Codes or equivalent

Means for stepping up the AC voltage generated 3 is also commonly provided. In the specific embodiment, a transformer having a 5 to 1 step-up ratio is employed. Accordingly, it would be expected that a 90 volt alternating current voltage would appear at its output. However, a voltage doubling means 26 is interplaced between AC generator 2 and transformer 3. Means 26 effectively doubles the expected output voltage to 180 volts. The voltage doubling means 26 will be discussed in greater detail subsequently.

Completing the discussion of the operation of the conversion function, it is necessary to introduce rectification means 4. It is believed apparent that a full wave rectifier bridge may be used to convert the 180 volt square wave alternating current output of the 5 to 1 step-up transformer to 180 volts of direct current voltage. The direct current voltage output of rectifier bridge 4 is stored upon capacitor 31 for subsequent application to load 34.

In general, an output voltage level between 50 and 200 volts is appropriate in portable test equipment for testing the operation of high voltage relays. For high voltage breakdown testing or electrical emergency first aid applications, higher output voltages may be required. It would then be appropriate to increase the battery size of battery 9 or the turns ratio of transformer 3 in order to obtain the required higher level DC output voltages.

In order to extend battery life, the present circuit includes energy conserving means comprising detection means 30, activation means 8, and inhibit circuit 1. Voltage detection means 30 is connected across capacitor 31. It is shown comprising a plurality of Zener diodes connected in series. The sum of the respective cut-off voltages of the Zener diodes equates to a predetermined level of voltage L appearing across capacitor 31.

Figure 2:
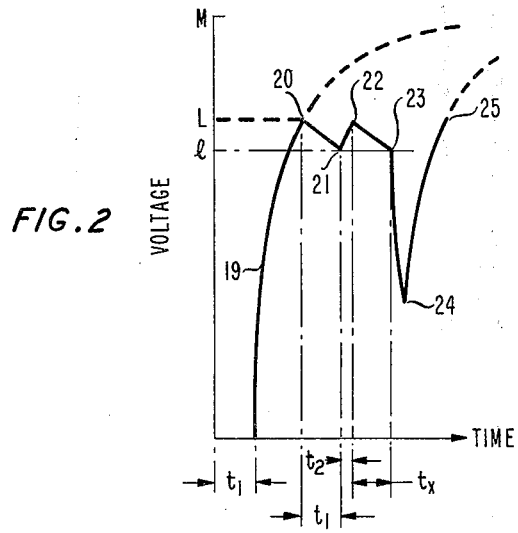
FIG. 2 is a graphical depiction of the operation of the subject DC-DC converter circuit in terms of voltage stored on the voltage storage means as a function of time.

Referring now also to FIG. 2, the predetermined level L shown in FIG. 2 represents the sum of the Zener cut-off voltages. It is believed apparent that this level L must be attainable across capacitor 31 and must be less than or equal to the maximum possible level of voltage attainable M. In the specific embodiment, the maximum circuit.

Initially the voltage upon capacitor 31 increases exponentially until level L is reached. Upon reaching level L, however, the voltage provided by AC generator 2 is cut off by the operation of opto-isolator 8, responsive to the Zener diodes 30. Mediary between opto-isolator 8 and the AC voltage generator 2 is inhibit circuit 1. Inhibit circuit 1 inhibits the operation of AC generator 2 for a selectable voltage cut-off interval $t_1$. At the conclusion of interval $t_1$, the AC generator 2 is permitted to resume the provision of AC voltage. Accordingly, the voltage conversion process also resumes.

Inhibit circuit 1 comprises timing circuit 1a and reset means 1b. It is desirable to employ reset means 1b to reset timing circuit 1a. Such resetting is especially useful when test activate switch SW27 is operated, closing contacts 27a and 27b, delivering the converted DC voltage to load 34. As the voltage stored upon capacitor 31 begins to be depleted, the DC conversion process to restore converted DC voltage on capacitor 31 can immediately begin.

Additionally, the timing circuit 1a comprises means 1a-1 for selecting the predetermined duration of the voltage cut-off interval. The selection means, comprising resistor $R_1$ and capacitor $C_1$, has been chosen in the specific embodiment to provide a timing constant $t_1$ of 5 seconds, the duration of the selectable voltage cut-off interval.

A Radio Corporation of America CD 4047 monostable/astable multivibrator or equivalent may be used as inhibit circuit 1. (Refer to Table A for pin strapping information.)

The operation of the energy conserving means will be explained in greater detail. Initially, the converted DC voltage does not begin to build on capacitor 31 until the predetermined voltage cut-off interval $t_1$ has lapsed. If this initial delay is undesirable, reset means 1b may be employed to eliminate the delay. After on/off battery switch SW1 is closed, applying battery to the circuit, test activate switch SW27 may be momentarily depressed. This closes contact 27a, activating reset means 1b to reset timing circuit 1a, eliminating the delay $t_1$.

After the initial delay $t_1$, a voltage is developed exponentially across capacitor 31 until level L is reached at point 20 on the curve. Upon reaching level L, opto-isolator 8, responsive to Zener diodes 30, activates the inhibit circuit 1. Accordingly, the AC voltage generator 2 is turned off. The voltage level stored on capacitor 31 will begin an exponential decay. Exactly how much the voltage level will decay is a function of the capacitor 31, the resistance of the Zener diodes 30, the opto-emitter 8a, and a visual indicating means 29.

Visual indicating means 29 comprising a neon lamp is used to indicate to the crafts person user of the test apparatus when sufficient voltage is available on capacitor 31 to perform a test on load 34.

In the specific embodiment, the voltage level l which the level falls to after 5 seconds is about 85 volts. This phase of the operation of the energy conserving means is called the quiescent mode.

After the second interval $t_1$ has lapsed and the voltage level has reached l, the AC voltage generator 2 resumes developing a converted DC voltage on capacitor 31. This is shown as segment 21-22 in FIG. 2 and is identical to the segment parallel to it on curve 19. In the specific embodiment, approximately 1.2 seconds are required to recharge capacitor 31 to voltage level L. With respect to FIG. 2, this charging interval is labeled $t_2$. This phase of the operation of the energy conserving means is called the charging mode.

It is believed apparent from FIG. 2 that voltage level L should be chosen to be on the linear rise portion 19 of the exponential voltage curve. In this manner $t_2$ can be kept to a minimum.

Similarly, it is appropriate to select $t_1$ to be as long as interval as possible without materially effecting the voltage level which is required to operate load 34.

Continuing the discussion of FIG. 2, a second quiescent mode is shown commencing at point 22. While load operation may occur during either the charging or quiescent modes, it is shown in FIG. 2 as occurring at the lowest voltage point 23 of the second quiescent mode. This point was chosen to pictorially represent the worst case of load operation. Since the voltage level is at its lowest at this point, the level reached upon load operation 24 will also be expected to be its lowest value.

A crafts person pushes test activate switch SW27 to momentarily close contacts 27a and 27b and to operate the load 34. Inhibit circuit 1 is reset, immediately resuming the provision of converted DC voltage. Despite the renewed DC voltage output, the load draws the stored voltage level down to a minimum value 24. The load having operated and the contacts 27a and 27b again being opened, the voltage level stored is able to reach level L. The quiescent/charging cycle is repeated until on-off battery switch SW1 is turned off or another test of load 34 is made.

In the specific embodiment, battery is applied to the circuit 1.2 seconds out of every 6.2 seconds when the circuit is idle, that is, when it is not being used to supply converted DC voltage to load 34. The battery is applied along the efficient linear region 19 of the curve. In this manner, a considerable savings in energy is achieved, amounting to greater than 80% when the circuit is idle.

The operation of voltage doubling means 26 is now explained in detail. The voltage doubling means 26 comprises an even number of phase inverters, for example, 17a and 17b, in one lead to transformer 3. An odd number of phase inverters, for example 17c, is provided in the second lead to transformer 3.

As has been previously discussed, AC voltage generator 2 provides a square wave output. The generated square wave passing through inverters 17a and 17b assumes the same waveform as the generated wave. The wave having passed through inverter 17c is phase inverted relative to the generated square wave. In this manner, waveforms which are 180° out of phase with each other, 13 and 14, appear at opposite terminals of the transformer 3. Accordingly, in the specific embodiment, if each pulse has a magnitude of 18 volts, the peak to peak magnitude of the waveform to be stepped up is 36 volts. Accordingly, if transformers 3 has a 5 to 1 turns ratio, a 180 volt square wave alternating current output will be provided to terminals 15 and 16 of rectifier bridge 4. It is believed apparent that this is double the voltage than would have been provided without the voltage doubling means 26.

Voltage doubling means 26 may comprise no phase inverters at all in one lead to transformer 3 and only one phase inverter in the second lead. In the circuit of FIG. 1, two phase inverters, 17a and 17b, are shown because it is believed useful to use them as protection against any backwards transients of voltages proceeding from the transformer 3 back toward the AC voltage generator 2. (Refer to Table A for phase inverter amplifier circuit details).

Additionally, in the best mode of applying the voltage doubling means, a fail-safe feature is provided by AND gate 18. Gate 18 requires outputs from both the AC voltage generator 2 and inhibit circuit 1 for operating voltage doubling means 26. If either output is not present, then AND gate 18 will effectively thwart any provision of signal to transformer 3 and hence protect the battery 9 from being shorted by a path through transformer 3. (Refer to Table A for AND gate circuit details).

It is also believed desirable to provide transient protection means 28 for transformer 3. This is shown as comprising a contact protection network (CPN) connected across the primary winding of transformer 3.

We claim:

1. A regulated DC-DC converter circuit of the type adapted to develop a continuously increasing direct current voltage across a direct current voltage storage means (31) upon the presentation of a direct current voltage to the input of the DC-DC converter circuit Characterized by energy conserving means (30, 8, 1) connected across the voltage storage means (31) and adapted to inhibit the presentation of the input direct current voltage for a selectable voltage cut-off interval ($t_1$) when the stored direct current voltage exceeds a predetermined value (L), the energy conserving means comprising:

means (30) comprising a plurality of reference voltage diodes for detecting when the stored direct current voltage exceeds a predetermined value, activation means (8) comprising an opto-isolator circuit responsive to the detection means and means (1), responsive to the activation means (8), for inhibiting the presentation of the direct current voltage to the input of the DC-DC converter circuit for the selectable voltage cut-off interval ($t_1$).

2. A regulated DC-DC converter circuit of the type adapted to develop a continuously increasing direct current voltage across a direct current voltage storage means upon the presentation of a direct current voltage to the input of the DC-DC converter circuit characterized by
energy conserving means connected across the voltage storage means and adapted to inhibit the presentation of the input direct current voltage for a predetermined interval of time when the stored direct current voltage exceeds a predetermined value, the energy conserving means comprising
a reference voltage diode circuit for detecting when the stored direct current voltage exceeds the predetermined value, the reference voltage diode circuit connected across the direct current voltage storage means,
an opto-isolator circuit responsive to the reference voltage diode circuit and having an opto-emitter portion and an opto-responder portion, the opto-emitter connected in series with the reference voltage diode circuit, and
a timing circuit having a selectable timing constant, the timing circuit responsive to the opto-responder portion of the opto-isolator circuit.

3. A regulated DC-DC converter as described in claim 3 or claim 2
further characterized in that
the inhibit means (1) additionally comprises reset means (1b) responsive to a signal indicating the provision of the stored DC voltage to a load (34).

4. A DC-DC converter circuit of the type comprising means (2) for generating an alternating current voltage and means (3) for stepping up the generated alternating current voltage
characterized by
voltage doubling means (26) connected between the alternating current generating means (2) and the voltage step-up means (3) and adapted to provide a phase inverted waveform (14) of the generated alternating current signal on one of two leads to the AC voltage step-up means (3).

5. A DC-DC converter circuit as described in claim 4.
further characterized in that
the voltage doubling means (26) comprises an even number of phase inverting means (17a, 17b) in a first lead to the voltage step-up means (3) and an odd number of phase inverting means (17c) in the second lead to the voltage step-up means (3).

6. A DC-DC converter circuit as presented in claim 4 or 5 of the type adapted to develop a continuously increasing direct current voltage across a direct current voltage storage means (31) upon the presentation of a direct current voltage to the input of the DC-DC converter circuit
further characterized by
energy conserving means (30, 8, 1) connected to the output of the voltage storage means (31) and adapted to inhibit the presentation of the input direct current voltage for a predetermined interval of time when the stored direct current voltage exceeds a predetermined value.

7. A regulated DC-DC converter circuit of the type comprising AC voltage generating means (2), means (3) for stepping up the AC voltage generated, and means (31) adapted to store a continuously increasing direct current voltage upon the presentation of a direct current voltage to the input of the circuit
characterized by
energy conserving means (30, 8, 1) and voltage doubling means (26),
the energy conserving means (30, 8, 1) connected to the output of the voltage storage means (31) and adapted to inhibit the presentation of the input direct current voltage for a predetermined interval of time when the stored direct current voltage exceeds a predetermined value, the energy conserving means comprising
means (30) for detecting when the stored direct current voltage exceeds a predetermined value
activation means (8) responsive to the detection means (30) and
means (1) responsive to the activation means (8) for inhibiting the presentation of the direct current voltage to the input of the DC-DC converter circuit for a predetermined interval of time, and
the voltage doubling means (26) connected to the alternating current generating means (2) for providing a phase-inverted waveform (14) of the generated AC voltage on one of two leads to the AC voltage step-up means (3), responsive to the AC voltage generating means (2) and the DC voltage inhibit means (1), the voltage doubling means (26) comprising an even number of phase inverting means (17a, 17b) in the first lead to the voltage step-up means (3) and an odd number of phase inverting means (17c) in the second lead to the voltage step-up means (3).

8. A regulated DC-DC converter as described in claim 7
further characterized in that the DC voltage inhibit means (1) comprises a timing circuit (1a) and a reset means (1b) responsive to a signal indicating the provision of the stored DC voltage to a load (34).

9. A regulated DC-DC converter circuit of the type adapted to develop a continuously increasing direct current voltage across a direct current voltage storage means upon the presentation of a direct current voltage to the input of the DC-DC converter
characterized by
means connected in parallel with the voltage storage means, the means for detecting when the stored direct current voltage exceeds a predetermined value, said means comprising:
a reference voltage diode circuit comprising a plurality of reference voltage diodes and
an activation means, connected in series with the reference voltage diode circuit, the activation means providing an inhibit signal to an inhibit circuit.

10. A regulated DC-DC converter circuit as recited in claim 9
characterized in that
the activation means comprises an opto-isolator circuit having an opto-emitter portion and an opto-responder portion, the opto-emitter portion connected in series with the reference voltage diode circuit.

* * * * *